(12) United States Patent
Shimoi et al.

(10) Patent No.: US 8,951,687 B2
(45) Date of Patent: Feb. 10, 2015

(54) FUEL CELL SYSTEM, AND METHOD OF STOPPING FUEL CELL SYSTEM

(75) Inventors: Ryoichi Shimoi, Yokohama (JP);
Hayato Chikugo, Yokosuka (JP);
Mitsunori Kumada, Yokosuka (JP);
Takashi Aoyama, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 541 days.

(21) Appl. No.: 12/996,532

(22) PCT Filed: Jun. 4, 2009

(86) PCT No.: PCT/JP2009/060235
§ 371 (c)(1),
(2), (4) Date: Dec. 6, 2010

(87) PCT Pub. No.: WO2009/150990
PCT Pub. Date: Dec. 17, 2009

(65) Prior Publication Data
US 2011/0076580 A1    Mar. 31, 2011

(30) Foreign Application Priority Data

Jun. 11, 2008    (JP) ................................ 2008-152565

(51) Int. Cl.
*H01M 8/04* (2006.01)
*H01M 8/06* (2006.01)
*H01M 8/10* (2006.01)

(52) U.S. Cl.
CPC ...... *H01M 8/04783* (2013.01); *H01M 8/04223* (2013.01); *H01M 8/04328* (2013.01); *H01M 8/04335* (2013.01); *H01M 8/04388* (2013.01); *H01M 8/04395* (2013.01); *H01M 8/04425* (2013.01); *H01M 8/04455* (2013.01); *H01M 8/04559* (2013.01); *H01M 8/04589* (2013.01);
(Continued)

(58) Field of Classification Search
USPC .................................. 429/429, 408, 427, 505
See application file for complete search history.

(56) References Cited

U.S. PATENT DOCUMENTS

2006/0254906 A1    11/2006   Numata et al.
2010/0239928 A1*   9/2010    Tsuchiya ...................... 429/430

FOREIGN PATENT DOCUMENTS

EP    1 580 828 A2    9/2005
JP    7-183039 A      7/1995
(Continued)

OTHER PUBLICATIONS

Horai, J., Machine translation of JP 2007-103023 A, Apr. 2007.*
(Continued)

*Primary Examiner* — Sean P Cullen
(74) *Attorney, Agent, or Firm* — Foley & Lardner LLP (57) ABSTRACT

For implementing a stop control which extracts a current from a fuel cell and consumes a cathode side oxygen at a system stop, the current extraction from the fuel cell is ended in a state that a certain quantity of oxygen smaller than when the current extraction is started remains on a cathode side of the fuel cell. With this, the hydrogen movement to the cathode side after the system stop can be effectively suppressed and thereby a cathode internal hydrogen concentration at the system start can be kept low, thus making it possible to properly process the cathode side hydrogen at the system start.

23 Claims, 6 Drawing Sheets

(52) U.S. Cl.
CPC ...... *H01M 8/04798* (2013.01); *H01M 8/04805* (2013.01); *H01M 8/04992* (2013.01); *H01M 8/0662* (2013.01); *H01M 8/04261* (2013.01); *H01M 8/0447* (2013.01); *H01M 8/04955* (2013.01); *H01M 2008/1095* (2013.01); *Y02E 60/50* (2013.01)
USPC ............ 429/429; 429/408; 429/427; 429/505

(56) References Cited

FOREIGN PATENT DOCUMENTS

| JP | 2002-198075 | A | | 7/2002 |
|----|-------------|---|---|--------|
| JP | 2007-59120 | A | | 3/2007 |
| JP | 2007-103023 | A | | 4/2007 |
| JP | 2007-194157 | A | | 8/2007 |
| JP | 2007-273276 | A | | 10/2007 |
| JP | 2007-323959 | A | | 12/2007 |
| JP | 2008-4432 | A | | 1/2008 |
| JP | 2008010188 | A | * | 1/2008 |
| JP | 2008-140772 | A | | 6/2008 |
| WO | WO 2007117018 | A1 | * | 10/2007 |

OTHER PUBLICATIONS

Matsuda et al., Machine translation of JP 2008-010188 A, Jan. 2008.*
Japanese Office Action of JP 2008-152565, dated Feb. 19, 2013 (10 pages).

* cited by examiner

FIG. 8

FUEL CELL SYSTEM, AND METHOD OF STOPPING FUEL CELL SYSTEM

The present invention relates to a fuel cell system which implements an electric power generation by supplying a fuel gas to an anode side of a fuel cell and an oxidant gas to a cathode side of the fuel cell. Especially, the present invention relates to the fuel cell system which implements a stop control preventing deterioration of the fuel cell by consuming a cathode side oxygen of the fuel cell at the system stop.

BACKGROUND ART

Conventionally, the following fuel cell system is known (for example, refer to Patent Literature 1): At a system stop, the fuel cell system continues the fuel gas supply to an anode side of the fuel cell and meanwhile stops the oxidant gas supply to the cathode side of the fuel cell. In such a state, the fuel cell system extracts the current from the fuel cell and consumes the cathode side oxygen of the fuel cell, so as to prevent deterioration of the fuel cell.

In the fuel cell system described in the Patent Literature 1; the voltage of the fuel cell during the time when the current is being extracted from the fuel cell is monitored, and the current extraction from the fuel cell is ended at the timing when the fuel cell voltage is decreased to such a value that the cathode side oxygen is determined to be sufficiently consumed.

CITATION LIST

Patent Literature

[Patent Literature 1]
Japanese Patent Application Laid-Open No. 2008-4432

SUMMARY OF INVENTION

Technical Problem

With the fuel cell system which implements the above stop control, however, in the case that the cathode side oxygen is excessively consumed by the stop control, the hydrogen quantity which moves from the anode side to the cathode side via an electrolyte membrane immediately after the fuel cell system stops is increased, thereby a cathode internal hydrogen concentration is likely to be high. With this, in the case that the time from the fuel cell system stop to the next start is relatively short, the cathode internal hydrogen concentration at the fuel cell system start is, as the case may be, over a hydrogen processing capability limit, thus failing to properly process a cathode side hydrogen, which was a problem.

Solution to Problem

According to the present invention, for implementing a stop control which extracts a current from a fuel cell and consumes a cathode side oxygen at the system stop, the current extraction from the fuel cell is ended in astute that a certain quantity of oxygen smaller than when the current extraction is started remains on a cathode side of the fuel cell.

Advantageous Effects of Invention

According to the present invention, the fuel cell system is stopped by ending the current extraction from the fuel cell in a state that a certain quantity of oxygen smaller than when the current extraction is started remains on the cathode side, thereby effectively suppressing the hydrogen movement to the cathode side after the system stop and thereby a cathode internal hydrogen concentration at the system start can be kept low, thus making it possible to properly process the cathode side hydrogen at the system start.

DESCRIPTION OF EMBODIMENTS

Hereinafter, specific embodiments of the present invention are to be set forth in detail, referring to the drawings.

First Embodiment

Figure 1:
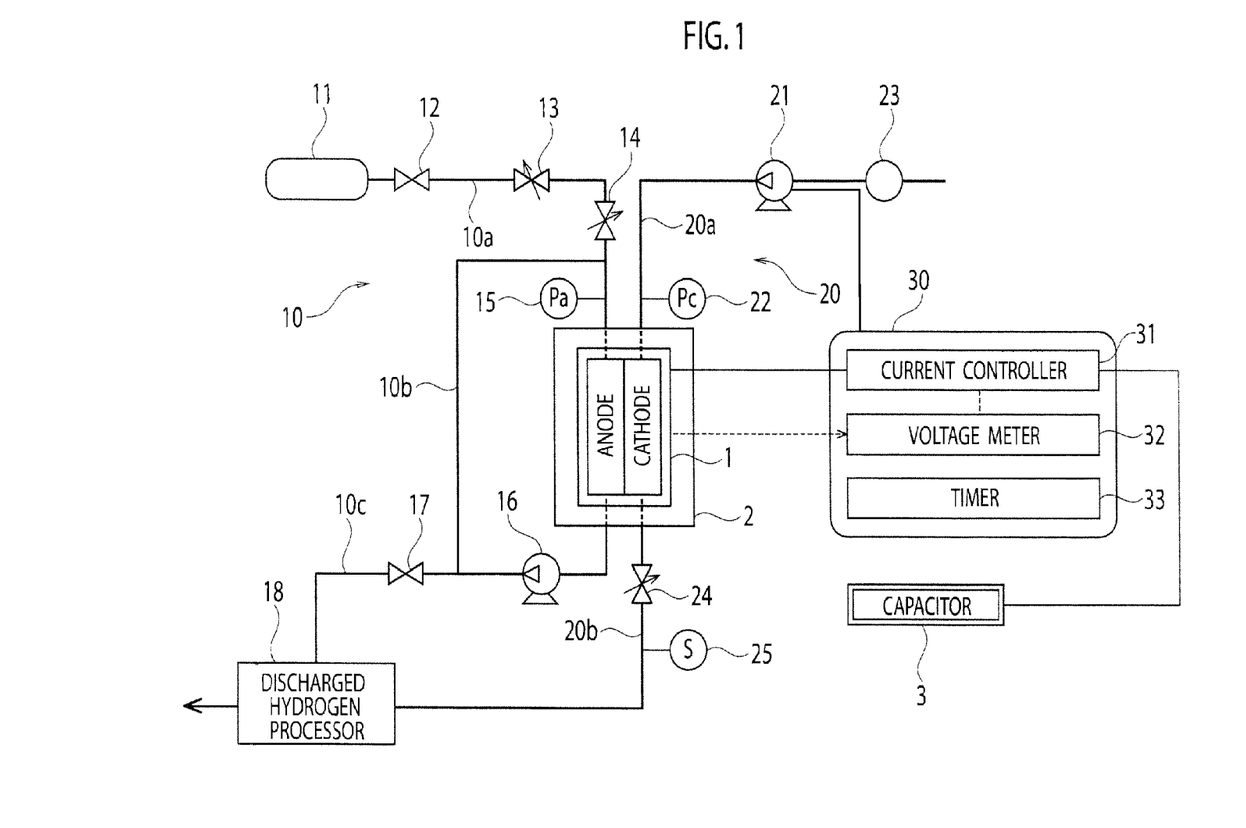
FIG. 1 is a system structure drawing showing an entire structure of a fuel cell system to which the present invention is applied.

FIG. 1 is a system structure drawing showing an entire structure of a fuel cell system, according to the first embodiment of the present invention. For example, as a driving source, the fuel cell system shown in FIG. 1 is installed in a fuel cell vehicle; and the fuel cell system supplies an electric power to a load device such as a driving motor of the vehicle and an accessory in the system. The above fuel cell system is provided with a fuel cell stack 1 including a plurality of stacked fuel cells.

Each of the fuel cells included in the fuel cell stack 1 has, for example, such a structure that a membrane electrode joint where a fuel electrode (anode) for receiving a supply of a fuel gas and an oxidant electrode (cathode) for receiving a supply of an oxidant gas are opposed to each other sandwiching therebetween a solid macromolecular electrolyte membrane is sandwiched by separators. The above fuel cells are stacked multi-steps to thereby form the fuel cell stack 1 to be received in a stack case 2. The separator of each of the fuel cells included in the fuel cell stack 1 is provided, on an anode side thereof, with a fuel gas flow pass for flowing the fuel gas and is provided, on a cathode side thereof, with an oxidant gas flow pass for flowing the oxidant gas. In addition, with the fuel cell stack 1, the fuel gas including hydrogen is supplied to the anode side of each of the fuel cells while the oxidant gas (air) including oxygen is supplied to the cathode side, to thereby allow ions to move in the solid macromolecular electrolyte membrane with water as medium and to contact with each other, to thereby implement an electric power generation.

Other than the fuel cell stack 1 which implements the electric power generation, the fuel cell system is provided with a hydrogen system 10 for supplying the fuel gas (pure hydrogen or hydrogen-containing gas) to the fuel cell stack 1, an air system 20 for supplying air (as an oxidant gas) to the fuel cell stack 1 and a system controller 30 for controlling operations of the entire fuel cell system.

The hydrogen system 10 is, for example, provided with a fuel tank 11 (for storing the fuel gas to be supplied to the fuel cell stack 1) and a fuel supply valve 12. Opening the fuel supply valve 12 supplies the fuel gas (extracted from the fuel tank 11) to the anode side of the fuel cell stack 1 via a fuel supply pipe 10a. In the fuel supply pipe 10a, a primary pressure regulator valve 13 and a secondary pressure regulator valve 14 which are used to regulate pressure of the fuel gas to be supplied to the fuel cell stack 1, and an anode pressure sensor 15 for measuring pressure of the fuel gas on an anode inlet side of the fuel cell stack 1 are installed. In addition, other than the fuel tank 11, another fuel gas supply source may be used such as a fuel supplier for supplying the fuel gas generated, for example, by using a modifier.

On an outlet side of the fuel cell stack 1, a fuel circulating pipe 10b is connected. The other end of the fuel circulating pipe 10b is connected with the fuel supply pipe 10a, and a fuel circulating pump 16 is disposed in the fuel circulating pipe 10b. By means of an operation of the fuel circulating pump 16, the fuel gas discharged from the anode outlet of the fuel cell stack 1 is again supplied from the fuel supply pipe 10a via the fuel circulating pipe 10b to the anode side of each of the fuel cells included in the fuel cell stack 1. With this, an excess supply ratio (SRa) of the fuel gas can be increased. In addition, such a structure is allowed: other than the fuel circulating pump 16 or in combination with the fuel circulating pump 16, setting an ejector at a merge between the fuel circulating pipe 10b and the fuel supply pipe 10a to thereby circulate the fuel gas.

In addition, on the anode outlet side of the fuel cell stack 1, a fuel discharge pipe 10c is connected in such a configuration as to be divided from the fuel circulating pipe 10b. A fuel purge valve 17 is disposed in the fuel discharge pipe 10c and a discharged hydrogen processor 18 is disposed on a downstream side of the fuel purge valve 17. In the case of the fuel cell system which reuses the fuel gas by circulating the fuel gas, impurities such as nitrogen and argon are gradually stored in the circulated fuel gas and then the hydrogen concentration is likely to be lower. In this case, by opening the fuel purge valve 17, the thus stored impurities can be discharged from the fuel discharge pipe 10c together with the fuel gas discharged from the fuel cell stack 1. The fuel gas discharged by opening the fuel purge valve 17 is processed by the discharged hydrogen processor 18 disposed on the downstream side of the fuel purge valve 17.

Figure 2:
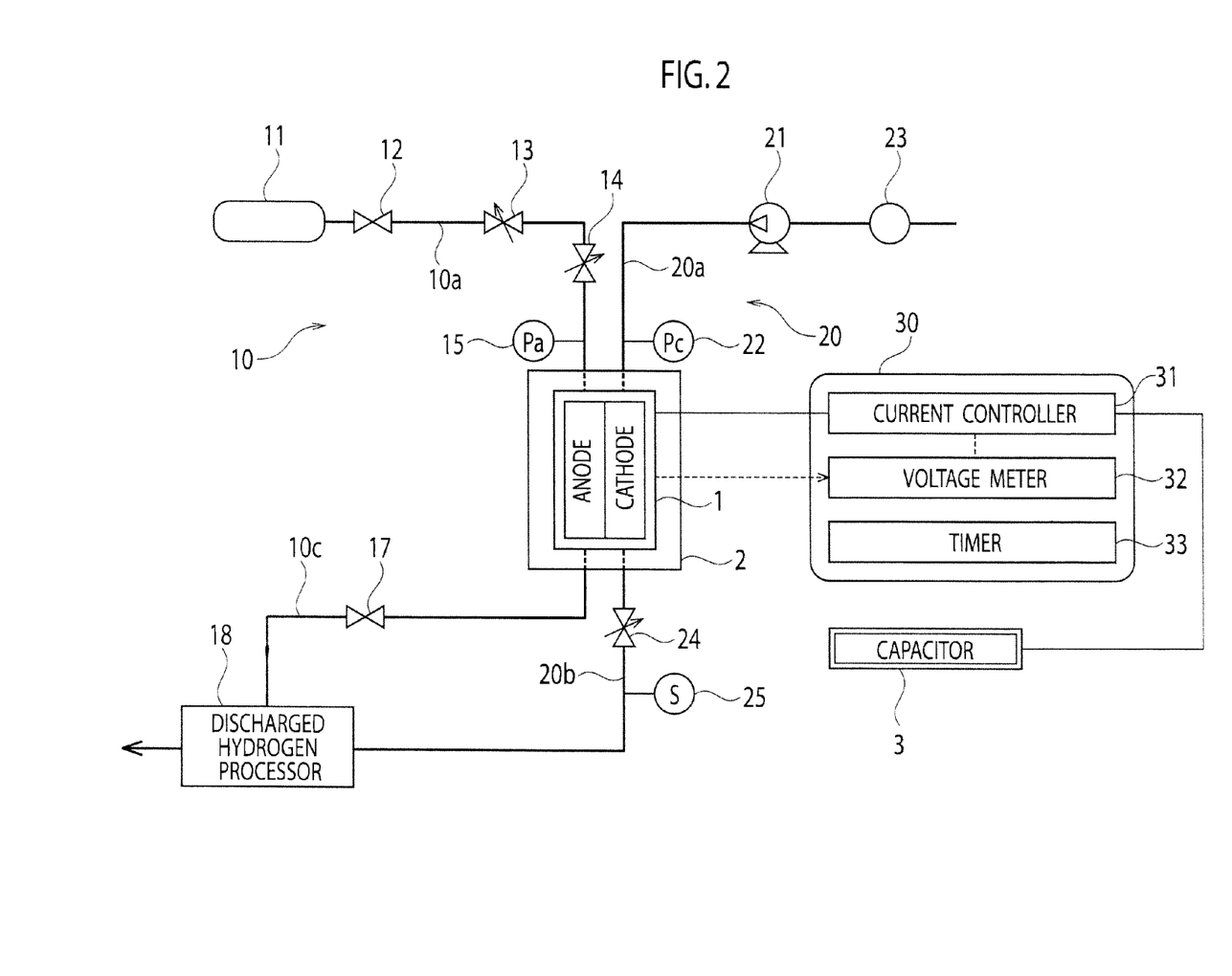
FIG. 2 is a system structure showing another example of the structure of a hydrogen system of the fuel cell system.

In addition, the structure of the hydrogen system 10 is not limited to the above circulating system for circulating the fuel gas discharged from the anode outlet of the fuel cell stack 1. Otherwise, for example, as shown in FIG. 2, without providing the fuel circulating pipe 10b and fuel circulating pump 16, a structure that the discharged fuel gas is supplied to the discharged hydrogen processor 18 by opening the fuel purge valve 17 is allowed.

The air system 20 is, for example, provided with an air compressor 21 for taking in an external air and then pressurizing the external air. Via an oxidant supply pipe 20a, the air as an oxidant gas from the air compressor 21 is supplied to the cathode side of each of the fuel cells included in the fuel cell stack 1. In the oxidant supply pipe 20a, a cathode pressure sensor 22 for measuring pressure of the oxidant gas on the cathode inlet side of the fuel cell stack 1 is disposed. In addition, on an upstream side of the air compressor 21 in the oxidant gas supply pipe 20a, an oxidant flow meter 23 for measuring flowrate of the air to be absorbed in the air compressor 21 is disposed.

Moreover, an oxidant discharge pipe 20b is connected to the cathode outlet side of the fuel cell stack 1. The oxidant gas discharged from the fuel cell stack 1 is supplied to the discharged hydrogen processor 18 via the oxidant discharge pipe 20b. In the oxidant discharge pipe 20b, there are disposed an oxidant pressure regulator valve 24 (for regulating pressure of the oxidant gas supplied to the fuel cell stack 1) and a hydrogen concentration sensor 25 (for measuring hydrogen concentration in the discharged oxidant gas to be supplied to the discharged hydrogen processor 18 via the oxidant discharge pipe 20b). In addition, the hydrogen concentration sensor 25 may otherwise be disposed on the downstream side of the discharged hydrogen processor 18.

Figure 3:
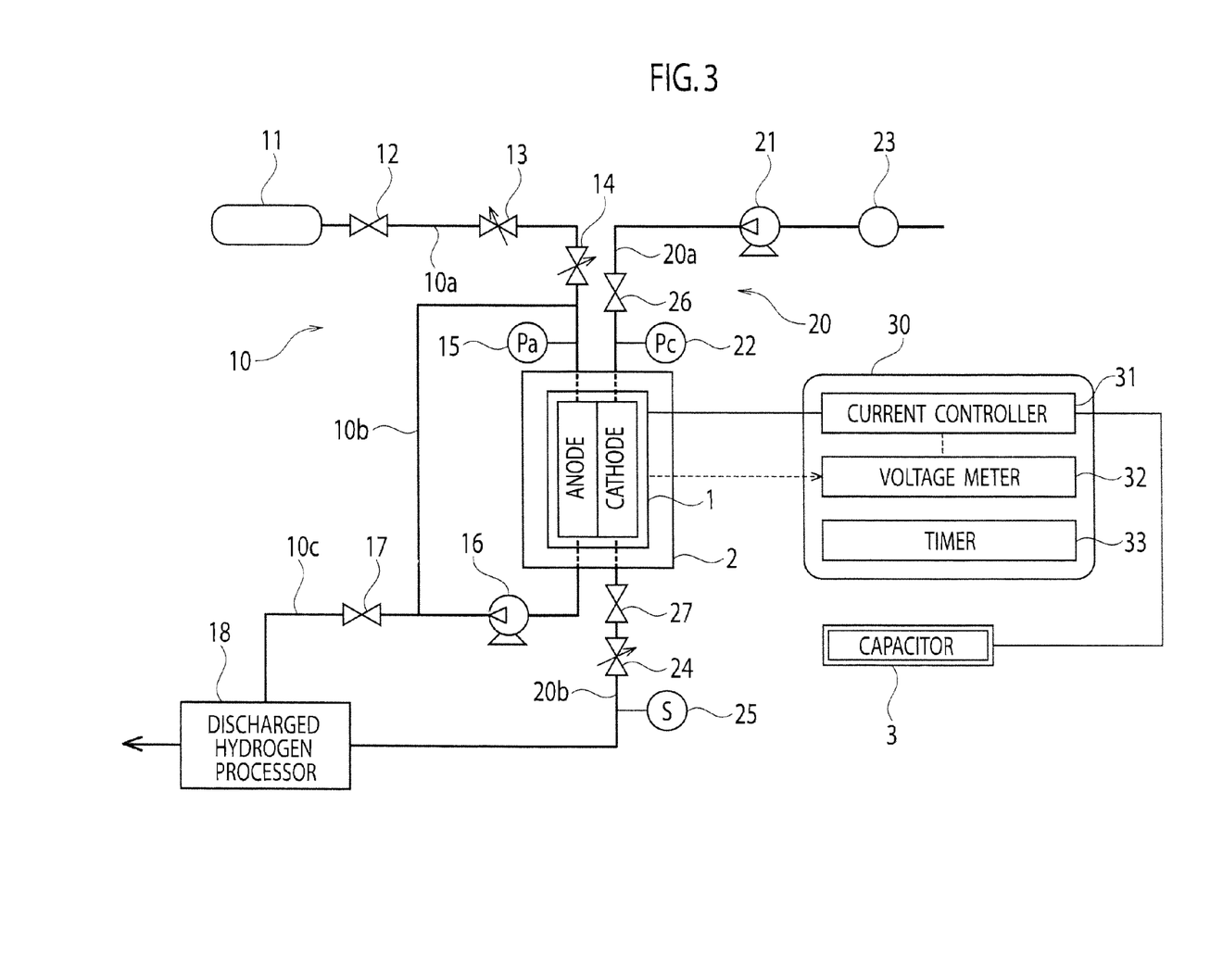
FIG. 3 is a system structure showing another example of the structure of an air system of the fuel cell system.

In addition, the air system 20 may have such as structure, for example as shown in FIG. 3, that an oxidant inlet valve 26 is disposed at the oxidant supply pipe 20a and an oxidant outlet valve 27 is disposed at the oxidant discharge pipe 20b such that closing the oxidant inlet valve 26 and the oxidant outlet valve 27 can seal the cathode side of the fuel cell stack 1.

To less than or equal to a combustible concentration, the discharged hydrogen processor 18 processes the hydrogen in the fuel gas discharged from the fuel discharge pipe 10c via the fuel purge valve 17 and the hydrogen which moves from the anode side of the fuel cell stack 1 to the cathode side of the fuel cell stack 1 and is discharged from the fuel cell stack 1 together with the discharged oxidant gas. Then, the discharged hydrogen processor 18 discharges the above types of hydrogen out of the fuel cell system. For the discharged hydrogen processor 18, for example, a catalytic combustor which reacts the oxygen in the oxidant gas with the hydrogen in the discharged fuel gas by using a platinum catalyst or a diluter which is provided with a ventilator and decreases the hydrogen concentration by newly supplying a diluted gas is used. Moreover, in the case that the hydrogen concentration in the gas discharged from the oxidant discharge pipe 20b is sufficiently lower than the combustible concentration, a mixer having the following operations may be used as the discharged hydrogen processor 18: mixing the fuel gas (discharged from the fuel discharge pipe 10c) with the gas (discharged from the oxidant discharge pipe 20b), thereby decreasing the hydrogen concentration less than or equal to the combustible concentration, and then discharging the mixture out of the fuel cell system.

The system controller 30 makes an entire control of the operations of the entire fuel cell system and includes, for example, a microcomputer or the like which mainly includes CPU, ROM, RAM and input-output interface. The system controller 30 controls each portion of the system according to a certain control program, to thereby control an operation state of the fuel cell stack 1. In addition, the system controller 30 includes a current controller 31 for adjusting the current value extracted from the fuel cell stack 1 and a voltage meter 32 for measuring the voltage of the fuel cell stack 1. The system controller 30 has such a function as to determine the electric power generation state of the fuel cell stack 1 from the voltage of the fuel cell stack 1, and to control the extracted current from the fuel cell stack 1 so as to properly implement the current extraction according to the electric power generation state of the fuel cell stack 1. In addition, the current extracted from the fuel cell stack 1 under the control by the system controller 30 is supplied to a load which includes a capacitor 3 such as a secondary battery.

In addition, according to the first embodiment, at the system stop, the fuel cell system continues the fuel gas supply to the anode side of the fuel cell stack 1 and meanwhile stops the oxidant gas supply to the cathode side of the fuel cell stack 1. In such a state, the fuel cell system extracts the current from the fuel cell stack 1 and consumes the cathode side oxygen of the fuel cell stack 1. With this stop control at the system stop, stopping the system in a state that the oxygen concentration in the fuel cell stack 1 is decreased suppresses a local cell from being formed at the next system start, to thereby prevent deterioration of the fuel cell stack 1. The stop control at the system stop is implemented under the control by the system controller 30. With the fuel cell system according to the first embodiment, in the stop control implemented under the control by the system controller 30, especially, optimizing the timing for ending the current extraction from the fuel cell stack 1 suppresses the cathode internal hydrogen concentration of the fuel cell stack 1 from excessively increasing in a left-uncontrolled period after the system stop, to thereby making it possible to properly process the cathode side hydrogen of the fuel cell stack 1 at the next system start, which is an outstanding feature.

Figure 4:
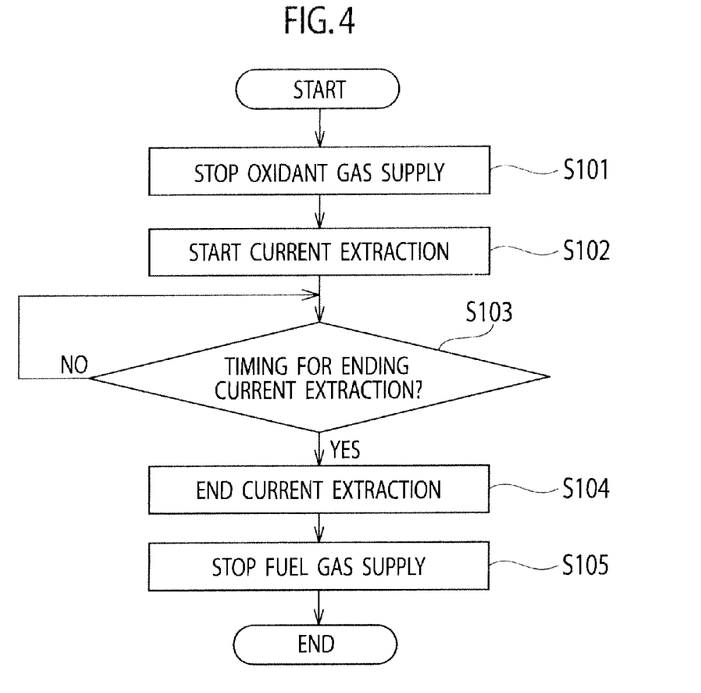
FIG. 4 is a flowchart showing an example of a stop control implemented by means of a system controller at a system stop.

Hereinafter described is the stop control which is implemented at the system stop, with respect to the fuel cell system according to the first embodiment. FIG. 4 is a flowchart showing an example of the stop control implemented at the system stop. The process shown in this flowchart is implemented by the system controller 30 according to an input of some stop signals which instruct the system stop, for example, the stop signals including an off signal of an ignition switch of a fuel cell vehicle. In addition, at the time point of starting the stop control, the fuel gas supply and oxidant gas supply to the fuel cell stack 1 are continued. Thereby, each of the devices such as the fuel circulating pump 16 and air compressor 21 which are necessary for supplying the fuel gas and oxidant gas is kept operating.

When the stop control is started, at first at step S101, the system controller 30 stops the oxidant gas supply to the cathode side of the fuel cell stack 1. Specifically, the system controller 30 outputs an operation stop instruction to the air compressor 21, to thereby stop operation of the air compressor 21. Then, in the case of the system structure in FIG. 3 where the oxidant inlet valve 26 is disposed at the oxidant supply pipe 20a and the oxidant outlet valve 27 is disposed at the oxidant discharge pipe 20b respectively, closing the oxidant inlet valve 26 and the oxidant outlet valve 27 seals the cathode side of the fuel cell stack 1.

Then, at step S102, the system controller 30 starts extracting the current from the fuel cell stack 1. The current extracted from the fuel cell stack 1 is so controlled by the current controller 31 that a certain current is extracted from the fuel cell stack 1 within the range that the fuel cell stack 1's lowest voltage measured by the voltage meter 32 is not 0 V (that is, within the range that the fuel cell where a potential is not generated due to hydrogen shortage on the anode side is not caused). The current extraction from the fuel cell stack 1 is a process which consumes the cathode side oxygen of the fuel cell stack 1 before the system stop to thereby prevent the fuel cell stack 1's deterioration. The current extracted from the fuel cell stack 1 is supplied to the capacitor 3. In addition, herein, the current extraction from the fuel cell stack 1 is started immediately after the oxidant gas supply to the cathode side of the fuel cell stack 1 is stopped. However, it is supposed that, for example, the air compressor 21's response delay and the like takes a more-or-less time until the oxidant gas supply is completely stopped. Therefore, while monitoring, for example, a detection value of the cathode pressure sensor 22, determining the timing when the oxidant gas supply to the cathode side of the fuel cell stack 1 is completely stopped and then starting the current extraction from the fuel cell stack 1 at the timing is allowed.

Then, at the step S103, the system controller 30 determines the timing for ending the current extraction from the fuel cell stack 1. With the conventional fuel cell system which implements this type of stop control at the system stop, it was general that, while monitoring the voltage of the fuel cell stack 1, the current extraction from the fuel cell stack 1 is ended at the timing when the voltage value of the fuel cell stack 1 is lowered to the voltage value that can be regarded that the cathode side oxygen is substantially completely consumed. However, continuing the current extraction until the cathode side oxygen of the fuel cell stack 1 is substantially completely consumed increases, immediately after the system stop, the hydrogen quantity which moves from the anode side to the cathode side via the solid macromolecular electrolyte membrane. With this, the cathode internal hydrogen concentration, as the case may be, goes beyond the limit at which the cathode internal hydrogen concentration can be processed by the discharged hydrogen processor 18 at the system start, to thereby making it impossible to properly process the cathode side hydrogen. Therefore, with the fuel cell system according to the first embodiment, at the timing when a certain quantity of oxygen remains on the cathode side, the current extraction from the fuel cell stack 1 is ended. In addition, specific examples of determining the ending of the current extraction are to be detailed later.

Then, at the step S104, the system controller 30 ends the current extraction from the fuel cell stack 1. At the step S105, the system controller 30 stops the fuel gas supply to the anode side of the fuel cell stack 1. Specifically, the system controller 30 outputs an operation stop instruction to the fuel circulating pump 16 to thereby stop the operation of the fuel circulating pump 16. Moreover, the system controller 30 closes the fuel supply valve 12 while fully closes the primary pressure regulator valve 13 and secondary pressure regulator valve 14. With this, the stop control at the system stop is ended.

Hereinafter, a specific example of the above determination of ending the current extraction in the above stop control (step S103 in flowchart in FIG. 4) is to be set forth.

As set forth above, with the fuel cell system of the first embodiment, the current extraction from the fuel cell stack 1 at the stop control is not continued until the cathode side oxygen of the fuel cell stack 1 is substantially completely consumed. Instead, the current extraction from the fuel cell stack 1 is ended at the timing when the certain quantity of oxygen smaller than when the current extraction is started remains on the cathode side of the fuel cell stack 1. Herein, the certain quantity (of oxygen) which serves as a criteria of determining the end of the current extraction is set to such a value that the certain quantity of oxygen remaining on the cathode side of the fuel cell stack 1 allows the cathode internal maximum hydrogen concentration in the left-uncontrolled period after the system stop to be less than the hydrogen processing capability limit at the system start.

Figure 5:
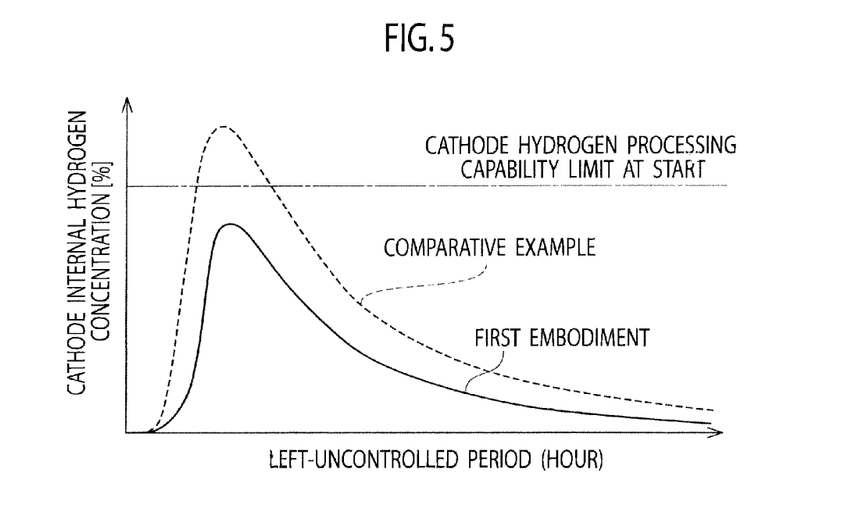
FIG. 5 is a drawing showing a cathode internal hydrogen concentration change according to an elapse of time in a left-uncontrolled period after the system stop.

FIG. 5 is a drawing showing the cathode internal hydrogen concentration change according to an elapse of time in the left-uncontrolled period after the system stop. Herein, the actual line graph in FIG. 5 denotes the cathode internal hydrogen concentration change according to an elapse of time in the left-uncontrolled period in the case that the current extraction from the fuel cell stack 1 is ended at the timing when the certain quantity of oxygen remains on the cathode side at the stop control (first embodiment). On the other hand, the broken line graph in FIG. 5 denotes the cathode internal hydrogen concentration change according to an elapse of time in the left-uncontrolled period in the case that the current extraction from the fuel cell stack 1 is ended at the timing when the cathode side oxygen is substantially completely consumed at the stop control (comparative example).

As shown in FIG. 5, the cathode internal hydrogen concentration in the left-uncontrolled period after the system stop is likely to be gradually decreased with an elapse of time after once increasing immediately after the system stop and then reaching a certain peak. It is conceived that the above is caused by the following operations; the stop control consumes the cathode side oxygen, thereby, hydrogen on the anode side immediately after the system stop moves to the cathode side via the solid macromolecular electrolyte membrane to thereby increase the cathode internal hydrogen concentration, the hydrogen movement from the anode side to the cathode side is ended at a step that the internal pressures on both electrodes are balanced, and then the cathode side hydrogen is gradually diffused with an elapse of time to thereby gradually decrease the cathode internal hydrogen concentration.

Herein, in the case that the current extraction from the fuel cell stack 1 is ended at the timing when the cathode side oxygen is substantially completely consumed at the stop control (comparative example), the hydrogen quantity moving from the anode to the cathode immediately after the system stop is large. Thereby, as shown by the broken line graph in FIG. 5, the peak value of the cathode internal hydrogen concentration (cathode internal maximum hydrogen concentration) is expected to go beyond the hydrogen processing capability limit at the system start. With this, in the case that the time from the system stop to the next start is relatively short, the system is started in such a state that the cathode internal hydrogen concentration goes beyond the hydrogen processing capability limit, thus making it impossible to properly process the cathode side hydrogen by means of the discharged hydrogen processor 18, which is a concern. In addition, the hydrogen processing capability limit at the system start is the discharged hydrogen processor 18's processing capability limit which is obtained when the hydrogen contained in the discharge gas from the cathode is processed by means of the discharged hydrogen processor 18 in the case that the cathode side is substituted with the oxidant gas at the system start. The hydrogen processing capability limit at the system start is obtained in advance according to a system design.

On the other hand, in the case that current extraction from the fuel cell stack 1 is ended at the timing when a certain quantity of oxygen remains on the cathode side at the stop control (first embodiment), as shown by the actual line graph in FIG. 5, the peak value of the cathode internal hydrogen concentration (cathode internal maximum hydrogen concentration) is less than the hydrogen processing capability limit at the system start. With this, regardless of the length of the left-uncontrolled period after the system stop, the system is started in such a state that the cathode internal hydrogen concentration is continuously lower than the hydrogen processing capability limit, thus making it possible to assuredly process the cathode side hydrogen by means of the discharged hydrogen processor 18 at the system start. In addition, the oxygen quantity (certain quantity) made to remain on the cathode side can be set in advance according to the system design, in view of a relation with the above hydrogen processing capability limit at the system start.

As set forth above, the stop control gradually consumes the cathode side oxygen of the fuel cell stack 1. Thereby, the longer the elapsed time from the stop control start is, the more decreased the oxygen remaining on the cathode side is. Herein, the certain quantity (as target quantity) of the remnant oxygen is set in advance. Therefore, solving the calculation which equates the remnant oxygen quantity to the certain quantity with the elapsed time from the stop control start as variable can obtain the required time until the remnant oxygen quantity on the cathode side reaches the certain quantity.

Then, according to the first embodiment, as an example for determining the end of the current extraction in the stop control, a method having the following operations is taken: before the stop control start, calculating the time required for the remnant oxygen quantity on the cathode side to reach the certain quantity; simultaneously with the stop control start, starting counting the required time by using the timer 33 provided for the system controller 30; and at the timing after an elapse of the required time, ending the current extraction from the fuel cell stack 1. Moreover, in place of the above method, for example, another method having the following operations can be adopted: from the stop control start, calculating from time to time at a certain calculation period the remnant oxygen quantity on the cathode side; and at the timing when the thus calculated remnant oxygen quantity is equal to the certain quantity, ending the current extraction from the fuel cell stack 1. The method which ends the current extraction by counting the required time is advantageous in that the system controller 30's processing load involved in the calculation of the remnant oxygen quantity can be decreased. Meanwhile, the method which ends the current extraction by calculating from time to time the remnant oxygen is advantageous in that the remnant oxygen quantity on the cathode side can be made to more accurately conform to the certain quantity.

Then, a method of calculating the cathode side remnant oxygen quantity which serves as a premise of determining the end of the current extraction at the stop control is to be set forth in detail.

When a cathode side initial oxygen quantity at the stop control start is denoted by $Qc0$, a cathode side oxygen consumption quantity by the stop control is denoted by $Qc1$ and an oxygen quantity diffused to the cathode side in the stop control is denoted by $Qc2$; a cathode side remnant oxygen quantity $Qc$ can be given by the following expression (1):

$$Qc = Qc0 - Qc1 + Qc2 \quad (1)$$

In addition, when the current extraction quantity from the fuel cell stack 1 by the stop control is small, the oxygen quantity $Qc2$ diffused to the cathode side in the stop control can be ignored. Therefore, the cathode side remnant oxygen quantity $Qc$ can be given by the following expression (2):

$$Qc = Qc0 - Qc1 \quad (2)$$

In the expression (1) and expression (2), the cathode side initial oxygen quantity $Qc0$ at the stop control start may be calculated by using the following expression (3):

$$Qc0 = Vc \times (Pc - PcH2O)/P0 \times CO2/100 \times (100 - Uc)/100 \times 273.15/(Tc + 273.15) \quad (3)$$

In the expression (3), $Vc$ denotes a cathode capacity (including a cathode flow pass internal capacity, a cathode inlet pipe capacity and a cathode outlet pipe capacity) and is obtained in advance through an actual measurement.

In addition, Pc (measured value) denotes a cathode pressure at the stop control start, and Tc (measured value) denotes a cathode internal gas temperature at the stop control start. In addition, PcH2O denotes a saturation water vapor pressure (RH=100%) at the Tc.

In addition, P0 denotes an atmospheric pressure, herein, P0=101.3 [kPa] is used for calculation. In addition, CO2 denotes an oxygen concentration (dry base) of the oxidant gas supplied to the cathode side in an ordinary electric power generation; and when the atmospheric pressure is used as the oxidant gas, CO2=21 [%] is used for calculation.

In addition, Uc denotes a cathode oxygen utilization ratio immediately before the stop control start, and is a value calculated from a current value extracted from the fuel cell stack 1 immediately before the stop control start and a flowrate of the oxidant gas supplied to the fuel cell stack 1 (ordinarily, Uc is close to 0).

Moreover, in the expression (1) and expression (2), the cathode side oxygen consumption quantity Qc1 by the stop control can be calculated by using the following expression (4) when the current value extracted from the fuel cell stack 1 is constant, and can be calculated by using the following expression (5) when the current value extracted from the fuel cell stack 1 varies from time to time.

$$Qc1 = (I \times Ncell + ix + ir) \times t \times 22.4/(4 \times F) \quad (4)$$

$$Qc1 = (\int I dt \times Ncell + (ix + ir) \times t) \times 22.4/(4 \times F) \quad (5)$$

In the expression (4) and expression (5), I denotes the current value extracted from the fuel cell stack 1 and is an actual measured value. Otherwise. I is a control target value in the case that the measurement is of difficulty. In addition, Ncell denotes the number of cells of the fuel cell stack 1 and is a known value.

In addition, ix denotes a cross leak current of the solid macromolecular electrolyte membrane of the fuel cell stack 1 and is a value obtained by calculating in advance the hydrogen consumption quantity and oxygen consumption quantity by the cross leak of the solid macromolecular electrolyte membrane at various temperatures and a humidity (100%). In addition, ir denotes a current consumed by a discharge resistance when the discharge resistance is connected to the fuel cell stack 1 and is a value (ir=V/r) which is calculated from the maximum stack voltage V [V] and a discharge resistance r [Ω].

In addition, t denotes a current extraction time from the stop control start. In addition, F denotes the Faraday constant and is a known value (96485 C/mol).

Moreover, in the expression (1), the oxygen quantity Qc2 diffused to the cathode side in the stop control can be calculated by using the following expression (6) when the cathode side is controlled to the atmospheric pressure, and otherwise can be calculated by using the following expression (7) when the cathode side is kept pressurized.

$$Qc2 = Qc1 \times CO2/100 \quad (6)$$

$$Qc2 = (P0 - Pc \times (Qc0 - Qc1)/Qc0) \times Qc0/Pc \times CO2/100 \quad (7)$$

In the expression (6) and expression (7), CO2 is an oxygen concentration (dry base) of the oxidant gas supplied to the cathode. However, a water vapor partial pressure of an external air is defined as substantially 0, to be used for calculation.

In the fuel cell system according to the first embodiment; by using the expressions set forth above, the system controller 30 can calculate the fuel cell stack 1's cathode side remnant oxygen quantity Qc in the implementation of the stop control. Then, in the case that the end of the current extraction at the stop control is determined by counting the required time, the current extraction time t from the stop control start in the case that the cathode side remnant oxygen quantity Qc is equal to the certain quantity set in advance is calculated as the required time. This required time t is set at the timer 33, to thereby start counting the required time t from the stop control start. Then, at the timing after an elapse of the required time t, the current extraction from the fuel cell stack 1 is to be ended. Moreover, in the case that the end of the current extraction is determined by calculating from time to time the cathode side remnant oxygen quantity Qc, the above expressions are used to thereby calculate the cathode side remnant oxygen quantity Qc from time to time per certain calculation period. Then, the current extraction from the fuel cell stack 1 may be ended at the timing when the thus calculated remnant oxygen quantity Qc is equal to the certain quantity set in advance.

As set forth above in detail by referring to specific examples, with the fuel cell system according to the first embodiment, when the stop control which consumes the cathode side oxygen of the fuel cell stack 1 is implemented at the system stop, the system controller 30 ends the current extraction from the fuel cell stack 1 at the timing when the certain amount of oxygen remains on the cathode side of the fuel cell stack 1. Thereby, the hydrogen movement to the cathode side after the system stop can be effectively suppressed and thereby the cathode internal hydrogen concentration at the system start can be kept low, thus making it possible for the discharged hydrogen processor 18 to properly process the cathode side hydrogen at the system start.

In addition, with respect to the certain quantity as a criteria of determining the end of the current extraction, the certain quantity of oxygen remains on the cathode side of the fuel cell stack 1 and thereby the cathode internal maximum hydrogen concentration in the left-uncontrolled period after the system stop is set to the value less than the hydrogen processing capability limit at the system start. Thereby, regardless of the length of the left-uncontrolled period after the system stop, the cathode internal hydrogen concentration at the next system start can be continuously suppressed to less than the hydrogen processing capability limit, to thereby allow the discharged hydrogen processor 18 to assuredly process the cathode side hydrogen at the system start.

Moreover, in the case that the system controller 30 calculates the required time t for the cathode side remnant oxygen quantity Qc of the fuel cell stack 1 to reach the certain quantity by the stop control and the current extraction from the fuel cell stack 1 is ended after an elapse of the required time t from the stop control start, the system controller 30's processing load involved in the calculation of the remnant oxygen quantity Qc can be decreased.

Moreover, in the case that the system controller 30 calculates from time to time the cathode side remnant oxygen quantity Qc of the fuel cell stack 1 from the stop control start and the current extraction from the fuel cell stack 1 is ended at the timing when the thus calculated remnant oxygen quantity Qc is equal to the certain quantity, the cathode side remnant oxygen quantity Qc can be made to more accurately conform to the certain quantity.

Second Embodiment

Then, the second embodiment of the present invention is to be set forth. The second embodiment is an example of a case in which the system stop control is implemented with an anode side closed after the anode side pressure of the fuel cell stack 1 is increased to be equal to or greater than the atmospheric pressure at the stop control (hereinafter referred to as anode increased pressure control). This anode increased pressure control is effective in that the oxygen quantity entering the fuel cell stack 1 in the left-uncontrolled period after the system stop is decreased so as to suppress the fuel cell stack 1's deterioration attributable to a local cell formation caused when the fuel gas (hydrogen) is supplied to the anode side at the next start. However, the anode side remnant hydrogen quantity at the system stop is increased, and thereby the hydrogen quantity which moves from the anode side to the cathode side via the solid macromolecular electrolyte membrane in the left-uncontrolled period is likely to be increased, thereby causing an increase in the cathode internal hydrogen concentration in the left-uncontrolled period. Such being the case, under in the second embodiment, according to the anode side remnant hydrogen quantity which is increased by the anode increased pressure control, the oxygen quantity made to remain on the cathode side, that is, the certain quantity as the criteria of determining the end of the current extraction at the stop control, is corrected to the increment side. Thereby, even when the anode increased pressure control is implemented, the discharged hydrogen processor 18 can assuredly process the cathode side hydrogen at the system start. In addition, the structure of the fuel cell system of the second embodiment is like that according to the first embodiment. Therefore, hereinafter, those featuring only the second embodiment are to be set forth while omitting repeated explanations of the first embodiment.

Figure 6:
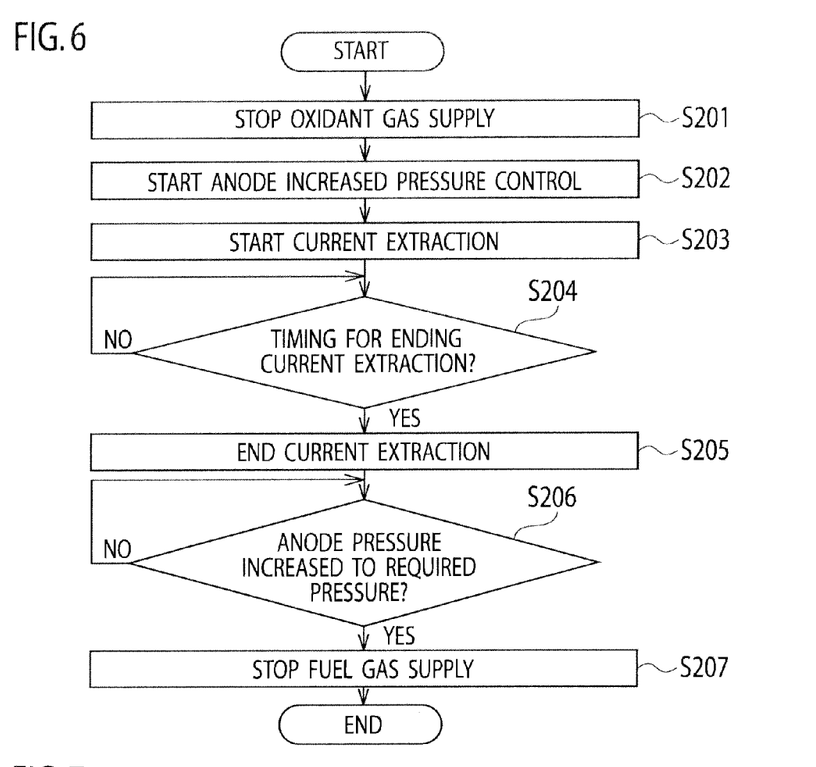
FIG. 6 is a flowchart showing an example of the stop control implemented by means of the system controller at the system stop, in the fuel cell system according to the second embodiment.

FIG. 6 is a flowchart showing an example of the stop control implemented at the system stop, with respect to the fuel cell system of the second embodiment. The process shown in this flowchart is implemented by the system controller 30 according to an input of some stop signals which instruct the system stop, for example, the stop signals including an off signal of an ignition switch of a fuel cell vehicle. When the stop control is started, at first at step S201, the system controller 30 stops the oxidant gas supply to the cathode side of the fuel cell stack 1. Specifically, the system controller 30 outputs an operation stop instruction to the air compressor 21, to thereby stop operation of the air compressor 21. Then, in the case of the system structure in FIG. 3 where the oxidant inlet valve 26 is disposed at the oxidant supply pipe 20a and the oxidant outlet valve 27 is disposed at the oxidant discharge pipe 20b respectively, closing the oxidant inlet valve 26 and the oxidant outlet valve 27 seals the cathode side of the fuel cell stack 1.

Then, at step S202, the system controller 30 starts controlling the anode side pressure of the fuel cell stack 1 to more than or equal to the atmospheric pressure, and then at step S203, the system controller 30 starts the current extraction from the fuel cell stack 1.

Then, at step S204, the system controller 30 determines the timing for ending the current extraction from the fuel cell stack 1. The basic concept of determining the end of the current extraction is the same as that of the first embodiment. According to the second embodiment, however, not only calculating the cathode side remnant oxygen quantity, the anode side remnant hydrogen quantity is calculated, and according to the anode side remnant hydrogen quantity increased by the anode increased pressure control, the certain quantity as the criteria of determining the end of the current extraction is to be corrected. In addition, the above correction quantity is to be determined according to the system structure and the like. The above correction quantity may be obtained after obtaining in advance the increment of the remnant oxygen quantity relative to the increment of the remnant hydrogen quantity through an experiment and the like.

Then, at step S205, the system controller 30 ends the current extraction from the fuel cell stack 1, and then at step S206, determines whether or not the anode side pressure is increased to a desired pressure. Then, when the anode side pressure is increased to the desired pressure, at step S207, the system controller 30 stops the fuel gas supply to the anode side of the fuel cell stack 1. Specifically, the system controller 30 outputs an operation stop instruction to the fuel circulating pump 16 to thereby stop the operation of the fuel circulating pump 16. Moreover, the system controller 30 closes the fuel supply valve 12 while fully closes the primary pressure regulator valve 13 and secondary pressure regulator valve 14. In addition, the fuel purge valve 17 is made into a fully closed state, to thereby seal the anode side. With this, the stop control including the anode increased pressure control at the system stop is ended.

Figure 7:
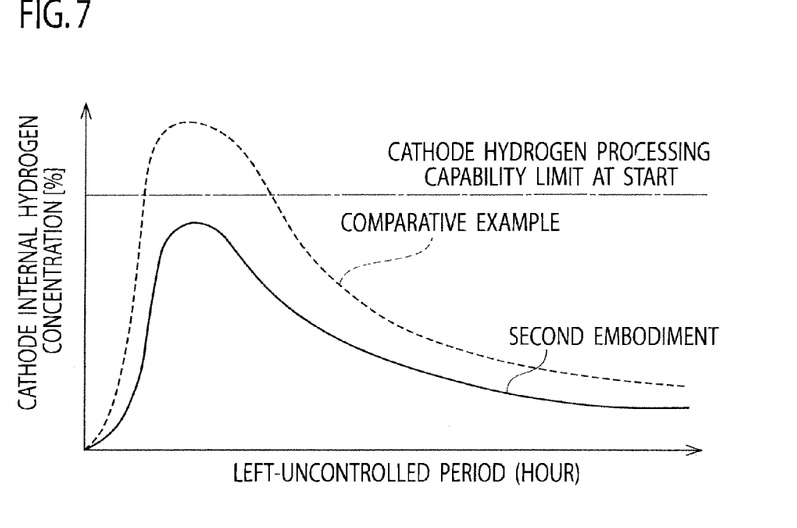
FIG. 7 is a drawing showing the cathode internal hydrogen concentration change according to an elapse of time in the left-uncontrolled period after the system stop, according the second embodiment.

FIG. 7 is a drawing showing the cathode internal hydrogen concentration change according to an elapse of time in the left-uncontrolled period after the system is stopped by the stop control including the anode increased pressure control. The actual line graph in FIG. 7 denotes the cathode internal hydrogen concentration change according to an elapse of time in the left-uncontrolled period in the case that the current extraction from the fuel cell stack 1 is ended at the timing when the certain quantity of oxygen corrected to the increment side according to the anode side remnant hydrogen quantity remains on the cathode side (second embodiment). On the other hand, the broken line graph in FIG. 7 denotes the cathode internal hydrogen concentration change according to an elapse of time in the left-uncontrolled period in the case that the current extraction from the fuel cell stack 1 is ended at the timing when the cathode side oxygen is substantially completely consumed (comparative example).

As shown in FIG. 7, in the case that the stop control including the anode increased pressure control is implemented, the hydrogen quantity which moves from the anode side to the cathode side in the left-uncontrolled period after the system stop is increased, thereby, the cathode internal hydrogen concentration in the left-uncontrolled period is higher than when the anode increased pressure control is not implemented (refer to FIG. 5). Even in such a case, as depicted by the actual line graph in FIG. 7, the current extraction from the fuel cell stack 1 is ended at the timing when the certain quantity of oxygen corrected to the increment side according to the anode side remnant hydrogen quantity at the system stop remains on the cathode side (second embodiment), to thereby allow the peak (cathode internal maximum hydrogen concentration) of the cathode internal hydrogen concentration to be less than the hydrogen processing capability limit at the system start. With this, like the above described first embodiment, regardless of the length of the left-uncontrolled period after the system stop, the cathode internal hydrogen concentration at the next system start can be suppressed to less than the hydrogen processing capability limit, to thereby allow the discharged hydrogen processor 18 to assuredly process the cathode side hydrogen at the system start.

As set forth above, in the fuel cell system according to the second embodiment, on the premise that the anode increased pressure control is implemented at the stop control, the certain quantity as the criteria of determining the end of the current extraction is corrected to the increment side according to the anode side remnant hydrogen quantity increased by this stop control, and the system controller 30 ends the current extraction from the fuel cell stack 1 at the timing when the certain quantity of oxygen thus corrected to the increment side remains on the cathode side. Hereinafter, a method of calculating the anode side remnant oxygen quantity as the criteria of obtaining the correction quantity of the oxygen made to remain on the cathode side is to be set forth specifically.

When an anode side initial hydrogen quantity at the stop control start is denoted by Qa0, an anode side hydrogen consumption quantity by the stop control is denoted by Qa1 and a hydrogen quantity supplied to the anode side in the stop control is denoted by Qa2; an anode side remnant hydrogen quantity Qa can be given by the following expression (8):

$$Qa=Qa0-Qa1+Qa2 \quad (8)$$

In this expression (8), the anode side initial hydrogen quantity Qa0 at the stop control start can be calculated by using the following expression (9).

$$Qa0=Va \times (Pa-PaH2O)/P0 \times CH2/100 \times (100-U_{impurity})/100 \times (100-Ua)/100 \times 273.15/(Ta+273.15) \quad (9)$$

In this expression (9), Va denotes an anode capacity (including an anode flow pass internal capacity and a pipe capacity in a circulating pass) and is obtained in advance through an actual measurement.

In addition, Pa (actual measurement) denotes an anode pressure at the stop control start, and Ta (actual measurement) denotes an anode internal gas temperature at the stop control start. In addition, PaH2O is a saturation water vapor pressure (RH=100%) at the Ta.

In addition, P0 is an atmospheric pressure, herein, P0=101.3 (kPa) is used for calculation. In addition, CH2 denotes a hydrogen concentration (dry base) of the fuel gas to be supplied to the anode side; and when a pure hydrogen is used as a fuel gas, CH2=100 [%] is used for calculation.

Inn addition, $U_{impurity}$ denotes an anode internal impurity concentration (ordinarily, nitrogen concentration) right before the stop control start and a nitrogen concentration control value at an ordinary operation can be used for $U_{impurity}$. In addition, Ua denotes an anode hydrogen utilization ratio right before the stop control start and is calculated from the current value extracted from the fuel cell stack 1 right before the stop control start and the fuel gas flowrate supplied to the fuel cell stack 1.

Moreover, in the expression (8), the anode side hydrogen consumption quantity Qa1 by the stop control can be calculated by using the following expression (10) in the case that the current value extracted from the fuel cell stack 1 is constant, and otherwise the anode side hydrogen consumption quantity Qa1 can be calculated by using the following expression (11) in the case that the current value extracted from the fuel cell stack 1 varies from time to time.

$$Qa1=(I \times Ncell+ix+ir) \times t \times 22.4/(2 \times F) \quad (10)$$

$$Qc1=(\int Idt \times Ncell+(ix+ir) \times t) \times 22.4/(2 \times F) \quad (11)$$

In the expression (10) and expression (11), I denotes the current value extracted from the fuel cell stack 1 and is an actual measured value. Otherwise, I is a control target value in the case that the measurement is of difficulty. In addition, Ncell denotes the number of cells of the fuel cell stack 1 and is a known value.

In addition, ix denotes a cross leak current of the solid macromolecular electrolyte membrane of the fuel cell stack 1 and is a value obtained by calculating in advance the hydrogen consumption quantity and oxygen consumption quantity by the cross leak of the solid macromolecular electrolyte membrane at various temperatures and a humidity (100%). In addition, ir denotes a current consumed by a discharge resistance when the discharge resistance is connected to the fuel cell stack 1 and is a value (ir=V/r) which is calculated from the maximum stack voltage V [V] and a discharge resistance r [Ω].

In addition, t denotes the current extraction time from the stop control start. In addition, F denotes the Faraday constant and is a known value (96485 C/mol).

Moreover, in the expression (8), the hydrogen quantity Qa2 supplied to the anode side in the stop control can be calculated by using the following expression (12).

$$Qa2=Qa1 \times CH2/100 \quad (12)$$

In the expression (12), CH2 denotes the hydrogen concentration (dry base) of the fuel gas supplied to the anode. However, the impurity quantity mixed to the anode in the stop control is ignorable, and therefore is not taken into account.

In the fuel cell system according to the second embodiment; by using the expressions set forth above, the system controller 30 can calculate the anode side remnant hydrogen quantity Qa of the fuel cell stack 1 which quantity Qa is caused when the stop control is implemented. Then, the certain quantity (set forth according to the first embodiment) as the criteria of determining the end of the current extraction is corrected to the increment side according to the thus calculated anode side remnant hydrogen quantity Qa, thereby, the discharged hydrogen processor 18 can assuredly process the cathode side hydrogen at the system start even when the anode increased pressure control is implemented at the stop control. In addition, the determination of the end of the current extraction from the fuel cell stack 1 may be implemented by the methods same as those according to the first embodiment. That is, in the case that the end of the current extraction at the stop control is determined by counting the required time, the current extraction time t with which the cathode side remnant oxygen quantity Qc is equal to the certain quantity corrected to the increment side according to the anode side remnant hydrogen quaintly Qa is calculated as the required time. This required time t is set at the timer 33, to thereby start counting the required time t from the stop control start. Then, at the timing after an elapse of the required time t, the current extraction from the fuel cell stack 1 is to be ended. Moreover, in the case that the end of the current extraction is determined by calculating from time to time the cathode side remnant oxygen quantity Qc, the cathode side remnant oxygen quantity Qc is calculated from time to time per certain calculation period, as set forth according to the first embodiment. Then, the current extraction from the fuel cell stack 1 is to be ended at the timing when the thus calculated remnant oxygen quantity Qc is equal to the certain quantity corrected to the increment side according to the anode side remnant hydrogen quantity Qa.

As set forth in detail above referring to a specific example, with the fuel cell system according to the second embodiment, the system controller 30 ends the current extraction from the fuel cell stack 1 at the timing when the certain quantity of oxygen corrected to the increment side according to the anode side remnant hydrogen quantity of the fuel cell stack 1 remains on the cathode side. Thereby, even when the anode increased pressure control is implemented at the stop control, the hydrogen movement to the cathode side after the system stop can be effectively suppressed and thereby the cathode internal hydrogen concentration at the system start can be kept low, thus making it possible for the discharged hydrogen processor 18 to properly process the cathode side hydrogen at the system start.

Moreover, in the fuel cell system according to the second embodiment, the anode increased pressure control is implemented at the stop control. Thereby, the oxygen quantity entering the fuel cell stack 1 in the left-uncontrolled period after the system stop is decreased and the fuel cell stack 1's deterioration attributable to the local cell formation caused at the system start can be effectively suppressed.

Third Embodiment

Then, the third embodiment of the present invention is to be set forth. According to the third embodiment, the above certain quantity as the criteria of determining the end of the current extraction at the stop control is set in such a value that the certain quantity of oxygen remaining on the cathode side of the fuel cell stack 1 allows the cathode internal maximum hydrogen concentration in the left-uncontrolled period after the system stop to be equal to the hydrogen processing capability limit at the system start. In addition, the structure of the fuel cell system and the details of the stop control implemented at the system stop are like those according to the first embodiment. Therefore, hereinafter, those featuring only the third embodiment are to be set forth while omitting repeated explanations of the first embodiment.

The stop control which extracts the current from the fuel cell stack 1 and consumes the cathode side oxygen at the system stop, as stated above, is for preventing the fuel cell stack 1's deterioration at the system start. Therefore, for increasing the above effect of the stop control, it is desired that the cathode side remnant oxygen quantity (Qc) be kept as small as possible. On the other hand, when the system is started in such a state that the cathode side remnant oxygen quantity (Qc) is too small, the cathode internal hydrogen concentration at the system start, as the case may be, goes beyond the hydrogen processing capability limit, as set forth above. Therefore, according to the third embodiment, so as to prevent the cathode internal hydrogen concentration at the system start from going beyond the hydrogen processing capability limit and so as to allow the system to stop in a state such that the cathode side oxygen is consumed at a maximum, the certain quantity as the criteria of determining the end of the current extraction at the stop control is so set that, with the certain quantity of oxygen remaining on the cathode side of the fuel cell stack 1, the cathode internal maximum hydrogen concentration in the left-uncontrolled period after the system stop is equal to the hydrogen processing capability limit at the system start.

Figure 8:
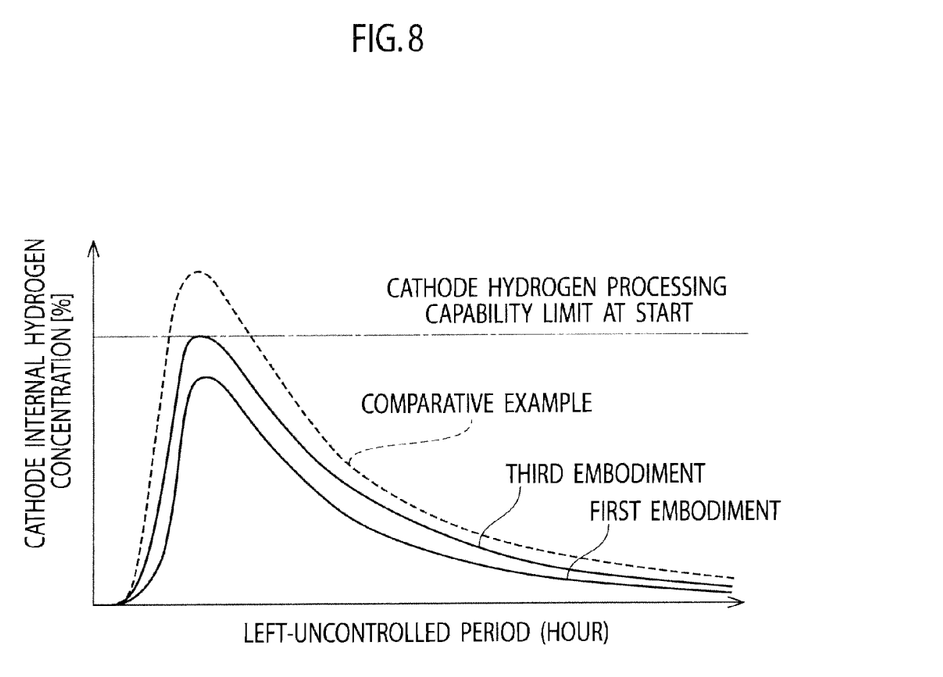
FIG. 8 is a drawing showing the cathode internal hydrogen concentration change according to an elapse of time in the left-uncontrolled period after the system stop, according to the third embodiment.

FIG. 8 is a drawing showing the cathode internal hydrogen concentration change according to an elapse of time in the left-uncontrolled period in the case that the current extraction from the fuel cell stack 1 is ended at the timing when the certain quantity of oxygen remains on the cathode side at the stop control. The certain quantity as the criteria of determining the end of the current extraction is so set that the cathode internal maximum hydrogen concentration in the left-uncontrolled period is equal to the hydrogen processing capability limit at the system start (third embodiment). On the other hand, as set forth according to the first embodiment, the cathode internal maximum hydrogen concentration in the left-uncontrolled period is set less than the hydrogen processing capability limit at the system start (first example). FIG. 8 shows a comparison between the first example and the third embodiment. In addition, the broken line graph in FIG. 8 denotes an example showing the case the that the current extraction from the fuel cell stack 1 is ended at the timing when the cathode side oxygen is substantially completely consumed at the stop control (comparative example).

As shown in FIG. 8, the current extraction from the fuel cell stack 1 is ended at the timing when the certain quantity of oxygen remains on the cathode side (first example and third example), to thereby prevent the peak of the cathode internal hydrogen concentration (cathode internal maximum hydrogen concentration) from going beyond the hydrogen processing capability limit at the system start. Regardless of the length of the left-uncontrolled period after the system stop, the discharged hydrogen processor 18 can assuredly process the cathode side hydrogen at the system start. Then, in the case that the certain quantity as the criteria of determining the end of the current extraction at the stop control is so set that the cathode internal maximum hydrogen concentration in the left-uncontrolled period is equal to the hydrogen processing capability limit at the system start (third example), the system is stopped in a state that the cathode side oxygen is consumed at a maximum, thereby maximizing the stop control's effect of preventing the fuel cell stack 1's deterioration.

As set forth above, in the fuel cell system according to the third embodiment, the system controller 30 ends the current extraction from the fuel cell stack 1 at the timing when the certain quantity of oxygen which quantity is so set that the cathode internal maximum hydrogen concentration in the left-uncontrolled period is equal to the hydrogen processing capability limit at the system start remains on the cathode side. Therefore, the discharged hydrogen processor 18 can properly process the cathode side hydrogen at the system start and the stop control's effect of preventing the fuel cell stack 1's deterioration can be maximized, thus effectively preventing the fuel cell stack 1's deterioration.

In addition, the first embodiment to the third embodiment exemplify specific examples to which the present invention is applied, and do not intend to limit the present invention to the contents set forth according to each of the embodiments. That is, the technical scope of the present invention is not limited to the specific technical matters disclosed in each of the embodiments and includes various modifications, changes and alternative technologies easily led from the disclosure. For example, in the structure of the fuel cell system exemplified as the embodiment, the hydrogen concentration sensor 25 is set at the air system 20, however, the hydrogen concentration sensor 25 is not essential for implementing the present invention and the present invention can be effectively implemented in a fuel cell system which is not provided with the hydrogen concentration sensor 25.

INDUSTRIAL APPLICABILITY

This invention can be used as a technology for properly processing the cathode side hydrogen at the start of the fuel cell system

REFERENCE SIGNS LIST

1 Fuel cell stack
10 Hydrogen system
18 Discharged hydrogen processor
20 Air system
30 System controller
31 Current controller

The invention claimed is:

1. A fuel cell system for implementing, at a system stop, a stop control which extracts a current from a fuel cell and consumes a cathode side oxygen when a supply of a fuel gas to an anode side of the fuel cell is continued and a supply of an oxidant gas to a cathode side of the fuel cell is stopped, the fuel cell system comprising:
a controller programmed for ending the stop control when a remaining quantity of cathode side oxygen is reduced to a certain quantity; and a hydrogen processor configured to process hydrogen by lowering a hydrogen concentration on the cathode side to less than or equal to a combustible concentration when the fuel cell system starts, wherein the certain quantity is set to a value such that a maximum hydrogen concentration on the cathode side in a left-uncontrolled period after the system stop is an internal maximum hydrogen concentration that is less than or equal to a hydrogen processing capability limit of the hydrogen processor at system start.

2. The fuel cell system according to claim 1, wherein the value is limited such that the certain quantity of oxygen remaining on the cathode side of the fuel cell allows the cathode internal maximum hydrogen concentration in the left-uncontrolled period after the system stop to equal the hydrogen processing capability limit of the hydrogen processor at the system start.

3. The fuel cell system according to claim 1, wherein the controller is programmed for calculating a required time for the remaining quantity of the cathode side oxygen to reach the certain quantity by the stop control, and the controller is programmed for ending the stop control at a timing of an elapse of a required time from a start of the stop control.

4. The fuel cell system according to claim 3, wherein the controller is programmed for calculating the remaining quantity of the cathode side oxygen by:
subtracting a cathode side oxygen consumption quantity consumed by the stop control from a cathode side initial oxygen quantity at the start of the stop control.

5. The fuel cell system according to claim 4, wherein the controller is programmed for calculating the cathode side initial oxygen quantity at the start of the stop control based on:
an oxygen concentration of the oxidant gas supplied to the cathode side before starting the stop control,
a cathode pressure, a cathode capacity, a cathode internal gas temperature, and a cathode internal gas humidity which are obtained in the stop control, and
a cathode oxygen utilization ratio right before the start of the stop control.

6. The fuel cell system according to claim 4, wherein the controller is further programmed for calculating the cathode side oxygen consumption quantity consumed by the stop control by adding a first quantity of oxygen consumed by a gas transmission of an electrolyte membrane of the fuel cell to an oxygen consumption quantity which is logically calculated from
a current extraction quantity extracted from the fuel cell, and
a number of cells of the fuel cell, and
wherein the controller is further programmed for calculating the cathode side oxygen consumption quantity consumed by the stop control by further adding a second quantity of consumed oxygen according to a consumption power consumed at discharge resistance.

7. The fuel cell system according to claim 3, wherein the controller is programmed for calculating the remaining quantity of the cathode side oxygen by:
subtracting a cathode side oxygen consumption quantity consumed by the stop control, from a cathode side initial oxygen quantity at the start of the stop control, and
adding a diffused oxygen quantity diffused to the cathode side in the stop control.

8. The fuel cell system according to claim 7, wherein based on an oxygen concentration of a gas which enters the cathode side through a cathode inlet or a cathode outlet according to a cathode pressure decreased by consumption of the cathode side oxygen, the controller is programmed for calculating the diffused oxygen quantity diffused to the cathode side in the stop control.

9. The fuel cell system according to claim 7, wherein the controller is programmed for calculating the cathode side initial oxygen quantity at the start of the stop control based on:
an oxygen concentration of the oxidant gas supplied to the cathode side before starting the stop control,
a cathode pressure, a cathode capacity, a cathode internal gas temperature, and a cathode internal gas humidity which are obtained in the stop control, and
a cathode oxygen utilization ratio right before the start of the stop control.

10. The fuel cell system according to claim 7, wherein the controller is further programmed for calculating the cathode side oxygen consumption quantity consumed by the stop control by adding a first quantity of oxygen consumed by a gas transmission of an electrolyte membrane of the fuel cell to an oxygen consumption quantity which is logically calculated from
a current extraction quantity extracted from the fuel cell, and
a number of cells of the fuel cell,
wherein the controller is further programmed for calculating the cathode side oxygen consumption quantity consumed by the stop control by further adding a second quantity of consumed oxygen according to a consumption power consumed at discharge resistance.

11. The fuel cell system according to claim 1, wherein from a start of the stop control, the controller is programmed for calculating the remaining quantity of the cathode side oxygen, and
the controller is programmed for ending the stop control at a timing when the calculated remaining quantity of the cathode side oxygen is equal to the certain quantity.

12. The fuel cell system according to claim 11, wherein the controller is programmed for calculating the remaining quantity of the cathode side oxygen by:
subtracting a cathode side oxygen consumption quantity consumed by the stop control from a cathode side initial oxygen quantity at the start of the stop control.

13. The fuel cell system according to claim 12, wherein the controller is programmed for calculating the cathode side initial oxygen quantity at the start of the stop control based on:
an oxygen concentration of the oxidant gas supplied to the cathode side before starting the stop control,
a cathode pressure, a cathode capacity, a cathode internal gas temperature, and a cathode internal gas humidity which are obtained in the stop control, and
a cathode oxygen utilization ratio right before the start of the stop control.

14. The fuel cell system according to claim 12, wherein the controller is further programmed for calculating the cathode side oxygen consumption quantity consumed by the stop control by adding a first quantity of oxygen consumed by a gas transmission of an electrolyte membrane of the fuel cell to an oxygen consumption quantity which is logically calculated from:
a current extraction quantity extracted from the fuel cell, and
a number of cells of the fuel cell,
wherein the controller is further programmed for calculating the cathode side oxygen consumption quantity consumed by the stop control by further adding a second quantity of consumed oxygen according to a consumption power consumed at discharge resistance.

15. The fuel cell system according to claim 11, wherein the controller is programmed for calculating the remaining quantity of the cathode side oxygen by:
- subtracting a cathode side oxygen consumption quantity consumed by the stop control, from a cathode side initial oxygen quantity at the start of the stop control, and
- adding a diffused oxygen quantity diffused to the cathode side in the stop control.

16. The fuel cell system according to claim 15, wherein the controller is programmed for calculating the cathode side initial oxygen quantity at the start of the stop control based on:
- an oxygen concentration of the oxidant gas supplied to the cathode side before starting the stop control,
- a cathode pressure, a cathode capacity, a cathode internal gas temperature, and a cathode internal gas humidity which are obtained in the stop control, and
- a cathode oxygen utilization ratio right before the start of the stop control.

17. The fuel cell system according to claim 15, wherein the controller is further programmed for calculating the cathode side oxygen consumption quantity consumed by the stop control by adding a first quantity of oxygen consumed by a gas transmission of an electrolyte membrane of the fuel cell, to an oxygen consumption quantity which is logically calculated from
- a current extraction quantity extracted from the fuel cell, and
- a number of cells of the fuel cell, wherein the controller is further programmed for calculating the cathode side oxygen consumption quantity consumed by the stop control by further adding a second quantity of consumed oxygen according to a consumption power consumed at discharge resistance.

18. The fuel cell system according to claim 1,
wherein the stop control includes a control for stopping the system when an anode pressure is increased to equal to or greater than an atmospheric pressure, and the anode side is sealed, and
wherein the control corrects the certain quantity to an increment side according to an anode side remnant hydrogen quantity which is increased according to the increased anode pressure.

19. A method of stopping a fuel cell system, the method comprising:
at a system stop, extracting a current from a fuel cell such that a supply of a fuel gas to an anode side of the fuel cell is continued and a supply of an oxidant gas to a cathode side of the fuel cell is stopped;
processing hydrogen by lowering a concentration of hydrogen on the cathode side to less than or equal to a combustible concentration; and
ending extraction of current from the fuel cell in a state that remaining quantity of cathode side oxygen is reduced to a certain quantity,
wherein the certain quantity is set to a value such that a maximum hydrogen concentration on the cathode side in a left-uncontrolled period after the system stop is an internal maximum hydrogen concentration that is less than or equal to a hydrogen processing capability limit of a hydrogen processing operation at a system start.

20. A fuel cell system comprising:
a fuel cell stack comprising an anode and a cathode opposed to the anode;
an oxidant supply pipe in fluid communication with the cathode, the oxidant supply pipe comprising a compressor for feeding oxidant gas to the cathode;
a hydrogen processor in fluid communication with both the cathode and the anode, the hydrogen processor configured to process hydrogen in gas discharged from the fuel cell stack, an ability of the hydrogen processor to process hydrogen having a limit at a system start; and
a system controller electrically connected to the compressor and the fuel cell stack, the system controller programmed for
- outputting an operation stop instruction to the compressor so as to stop the compressor from feeding the oxidant gas to the cathode,
- determining a time for ending current extraction from the fuel cell stack so as to leave a certain quantity of oxygen in the cathode, the certain quantity of oxygen causing a hydrogen concentration in the cathode to be less than or equal to the limit of the hydrogen processor, and
- ending the current extraction from the fuel cell stack at the time for ending current extraction.

21. The fuel cell system of claim 20, wherein the system controller is programmed for starting current extraction from the fuel cell stack.

22. The fuel cell system of claim 20, further comprising:
a fuel circulating pipe in fluid communication with the anode, the fuel circulating pipe comprising a fuel circulating pump for feeding fuel gas to the anode,
wherein the system controller is programmed for outputting a stop instruction to the fuel circulating pump.

23. The fuel cell system of claim 20, wherein the system controller is programmed for controlling pressure in the anode to be greater than or equal to an atmospheric pressure.

* * * * *